United States Patent [19]

Kanazawa et al.

[11] Patent Number: 4,552,239
[45] Date of Patent: Nov. 12, 1985

[54] FOUR-WHEEL STEERING DEVICE FOR VEHICLE

[75] Inventors: Hirotaka Kanazawa; Teruhiko Takatani; Naoto Takata, all of Hiroshima, Japan

[73] Assignee: Mazda Motor Corporation, Hiroshima, Japan

[21] Appl. No.: 545,190

[22] Filed: Oct. 25, 1983

[30] Foreign Application Priority Data

Oct. 26, 1982 [JP] Japan .................. 57-188023
Oct. 28, 1982 [JP] Japan .................. 57-189446
Oct. 28, 1982 [JP] Japan .................. 57-189447

[51] Int. Cl.$^4$ ........................................... B62D 5/06
[52] U.S. Cl. ................................ 180/140; 180/141
[58] Field of Search .............. 180/79, 140, 141, 142, 180/143

[56] References Cited

U.S. PATENT DOCUMENTS 4,295,657 10/1981 Sano et al. .................... 180/79
4,313,514 2/1982 Furukawa et al. ............ 180/143
4,406,472 9/1983 Furukawa et al. ............ 180/140
4,441,572 4/1984 Ito et al. ....................... 180/143

Primary Examiner—Joseph F. Peters, Jr.
Assistant Examiner—Donn McGiehan
Attorney, Agent, or Firm—Murray, Whisenhunt & Ferguson

[57] ABSTRACT

In the four-wheeled vehicle, both the front and rear wheels are turned in response to operation of the steering wheel. The turning angle of the rear wheels is controlled in accordance with a turning angle ratio characteristic curve defined on a $\theta F - \theta R$ plane wherein $\theta F$ and $\theta R$ respectively represent the turning angles of the front and rear wheels. The turning angle ratio characteristic curve is substantially a broken line having a positive inclination in the region where the value of the front wheel turning angle $\theta F$ is smaller than a predetermined value and having a smaller inclination in the region where the value of the front wheel turning angle $\theta F$ is larger than the predetermined value. The turning angle ratio characteristic curve is changed according to the vehicle speed so that the turning angle ratio $\theta R/\theta F$ is increased as the vehicle speed increases.

13 Claims, 8 Drawing Figures

FOUR-WHEEL STEERING DEVICE FOR VEHICLE

BACKGROUND OF THE INVENTION

1. Field of the Invention

This invention relates to a steering device for a four-wheeled vehicle, and more particularly to a four-wheel-steering device in which both the front and rear wheels are turned when the steering wheel is turned.

2. Description of the Prior Art

Conventionally, four-wheeled vehicles are steered by turning only the front wheels and the rear wheels are not positively turned though the rear wheels are caused to slightly toe in or out independently of the front wheels, according to the running condition of the vehicle.

Recently, there has been proposed a four-wheel steering device in which the rear wheels are also turned in response to operation of the steering wheel. See U.S. Pat. No. 4,295,657, for example.

The four-wheel steering device greatly improves the driving stability and makes various convenient operations of the vehicle feasible. For example, when the rear wheels are turned in the direction opposite to the front wheels (referred to as "reverse phase" turning) during very low speed operation of the vehicle to drive into a very limited parking space, the orientation of the vehicle body can be changed by a large amount to facilitate the parking operation. Further, the reverse phase turning of the front and rear wheels is advantageous in that the minimum turning radius of the vehicle can be minimized to facilitate U-turns, and the difference between the turning radii of the inner front wheel and the inner rear wheel can be minimized to facilitate operation of the vehicle on turning a narrow corner. Further, when the front and rear wheels are turned in the same direction (referred to as "equal phase" turning) during very low speed operation, the vehicle body can be laterally moved in translation. This is convenient for parking in a limited space.

Further when the front and rear wheels are turned in the equal phase when changing running lanes during intermediate to high speed operation of the vehicle, a lateral force acts simultaneously on the front and rear wheels to permit smooth lane-change with the yawing movement of the vehicle body being limited, whereby the operator can change running lanes safely even during high speed operation. By turning the rear wheels in the reverse phase, orientation of the vehicle body can be efficiently changed during cornering.

Further by turning the rear wheels so as to oppose them to external disturbances acting on the vehicle body such as lateral wind during straight travel of the vehicle, high running stability can be obtained during straight travel at high speed.

In the conventional steering systems in which only the front wheels are turned to steer the vehicle, the steering characteristics are adjusted to exhibit slight understeer tendency in order to ensure good stability during straight travel, and therefore, the vehicle tends to turn on a larger radius when accelerated with the turning angle of the steering wheel kept constant during cornering. In the four-wheel steering device, this tendency can be corrected by turning the rear wheels in the reverse phase. That is, in the four-wheel steering device, good cornering stability can be ensured even if the vehicle is accelerated or decelerated during cornering, by changing the turning angle of the rear wheels in response to the acceleration or the deceleration.

The four-wheel steering device is advantageous also from the roominess of the vehicle since it makes it possible to reduce the minimum turning radius of the vehicle for a given wheel base and accordingly the wheel base of the vehicle can be enlarged. Further, it provides an increased freedom in design of the vehicle body since it permits the maximum turning angle of the front wheels to be much smaller than that of the conventional two-wheel steering device.

Thus, the four-wheel steering device is advantageous from various viewpoints and is very useful.

There have been proposed various arrangements for effectively turning the rear wheels in the four-wheel steering device. For example, in the four-wheel steering device disclosed in U.S. Pat. No. 4,313,514, the rear wheels are turned in the reverse phase during low speed operation of the vehicle while they are turned in the equal phase during a high speed operation. In the device disclosed in Japanese Unexamined Patent Publication No. 56(1981)-5270, the rear wheels are turned in the equal phase when the turning angle of the front wheels is small while they are turned in the reverse phase when the turning angle of the front wheels is large. Further in the device disclosed in Japanese Unexamined Patent Publication No. 56(1981)-163969, the rear wheels are turned in proportion to the turning angle of the front wheels when the turning angle of the front wheels is smaller than a predetermined value, while the rear wheels are kept at a predetermined turning angle independent of the turning angle of the front wheels when the turning angle of the front wheels is not smaller than the predetermined value.

These four-wheel steering devices are directed to turning the rear wheels in the desirable direction based on the empirical rule that in most cases where orientation of the vehicle body is to be changed by a large amount, the vehicle speed is low or the turning angle of the front wheels is large, and in most cases where a slight lateral movement of the vehicle body is desired, the vehicle speed is high or the turning angle of the front wheels is small.

However, as a matter of fact, completely satisfactory driving performance and running stability cannot be obtained when the vehicle speed and the turning angle of the front wheels are only taken into account independently of each other. For example, even if the turning angle of the front wheels is fixed at a given angle and the rear wheels are turned by a desirable angle corresponding to the given turning angle of the front wheels during cornering, the vehicle tends to go out of the originally intended course outwardly or inwardly when the vehicle is accelerated or decelerated during the cornering. This is because the centrifugal force (lateral force) acting on the vehicle body changes with the vehicle speed. In order to prevent the vehicle from going out of the originally intended course, the ratio of the turning angle of the rear wheels to that of the front wheels (referred to as the "turning angle ratio" hereinbelow) must be changed with change in the vehicle speed. Accordingly the turning angle ratio is preferred to be changed according to the vehicle speed. Further, during intermediate to high speed operation of the vehicle, it is preferred that the turning angle ratio be increased in the equal phase as the vehicle speed is increased so that the lateral acceleration G is increased to permit smooth lane-changing, thereby improving the driving performance. On the other hand, it is preferred that the turning angle ratio be reduced as the vehicle speed is lowered from a high speed to an intermediate speed, to reduce the lateral acceleration G.

SUMMARY OF THE INVENTION

In view of the foregoing observations and description, the primary object of the present invention is to provide a four-wheel steering device in which the driving performance during intermediate to high speed operation of the vehicle is improved.

In accordance with the present invention, the turning angle of the rear wheels is increased with increase of the turning angle of the front wheels until the turning angle of the front wheels reaches a predetermined value and the increasing rate of the turning angle of the rear wheels is reduced after the turning angle of the front wheels reaches the predetermined value, and said predetermined value is changed according to the vehicle speed so that the ratio of the turning angle of the rear wheels to the turning angle of the front wheels, i.e., the turning angle ratio, is increased as the vehicle speed increases. More particularly, the turning angle of the rear wheels is controlled in accordance with a turning angle ratio characteristic curve defined on a $\theta F - \theta R$ plane, wherein $\theta F$ and $\theta R$ respectively represent the turning angles of the front and rear wheels. The turning angle ratio characteristic curve is substantially a broken line having a positive inclination in the region where the value of the front wheel turning angle $\theta F$ is smaller than a predetermined value and having a smaller inclination in the region where the value of the front wheel turning angle $\theta F$ is larger than the predetermined value. The point on the characteristics curve where the inclination thereof is changed will be referred to as an "inflection point" in this specification. The turning angle ratio characteristic curve is changed according to the vehicle speed so that the turning angle ratio is increased as the vehicle speed increases.

In one embodiment of the present invention, the turning angle ratio is increased as the vehicle speed increases by changing the turning angle ratio characteristic curve according to the vehicle speed so that the inflection point is shifted in the direction in which the value of $\theta F$ is reduced so that the inflection point of the curve for a higher vehicle speed has a smaller value of $\theta F$. In other words, the inclination of the characteristic curve in the region where the value of $\theta F$ is smaller than the predetermined value for each curve is changed so that the curve for a higher vehicle speed has a larger inclination.

In another embodiment of the present invention, the turning angle ratio is increased as the vehicle speed increases by changing the turning angle ratio characteristic curve according to the wheel speed so that the inflection point is shifted in the direction in which the value of $\theta R$ is increased so that the inflection point of the curve for a higher vehicle speed has a larger value of $\theta R$.

In the four-wheel steering device of the present invention, in the region where the front wheel turning angle $\theta F$ is smaller than the predetermined value (the value of $\theta F$ at the inflection point), the rear wheel turning angle $\theta R$ is increased with increase of the front wheel turning angle $\theta F$ and therefore a larger lateral acceleration G is apt to be generated, while in the region where the front wheel turning angle $\theta F$ is not smaller than the predetermined value, the increasing rate of the rear wheel turning angle $\theta R$ is reduced and therefore yawing is apt to occur. The former region is referred to as the "G region" and the latter region as the "$\psi$region" hereinbelow. Thus desirable rear wheel turning angles can be obtained according to the change of the turning angle of the front wheels or the steering wheel. At the same time, lateral acceleration is ensured during a high speed operation to facilitate lane changing while the lateral acceleration is limited to improve the cornering performance during low speed operation since the turning angle ratio is changed according to the vehicle speed.

The four-wheel steering device of the present invention comprises a front wheel steering mechanism, a rear wheel steering mechanism, a vehicle speed sensor and a controller for controlling the rear wheel steering mechanism in the manner described above.

DESCRIPTION OF THE PREFERRED EMBODIMENTS

FIGS. 1 to 6 respectively show control characteristics of the controller in accordance with several embodiments of the present invention.

In each figure, the turning angle ratio characteristic curves for a high speed V1, an intermediate speed V2 and a low speed V3 are shown as typical examples, and in some figures the characteristic curve for a very low speed V4 is further shown. The inflection points of the curves for the speeds V1 to V4 are respectively indicated at P1 to P4.

Figure 1:
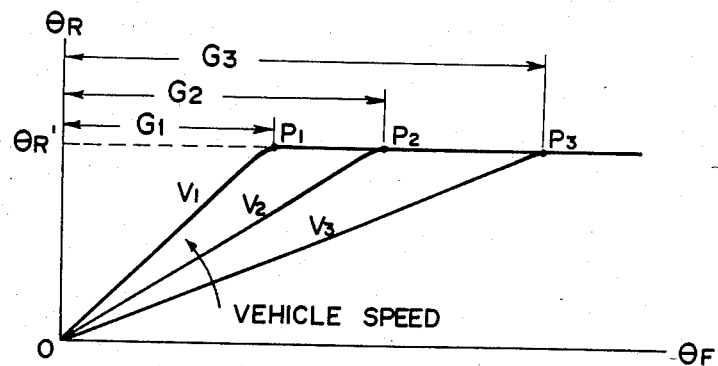
FIGS. 1 to 6 respectively show several examples of control characteristics according to which the rear wheels are controlled in the four-wheel steering device of the present invention.

In FIG. 1, when the steering wheel is turned during operation of the vehicle at the high speed V1, the rear wheels are turned in response to the turn of the front wheels with the turning angle of the rear wheels being controlled according to the leftmost turning angle ratio characteristics curve. When the vehicle is running at the intermediate speed V2, the turning angle of the rear wheels is controlled according to the middle curve and when the vehicle speed is low speed V3, the turning angle of the rear wheels is controlled according to the rightmost curve. As can be seen from FIG. 1, the values of $\theta F$ at the inflection points P1 to P3 decrease in this order. That is, the inflection point of the curve for a higher vehicle speed has a smaller value of $\theta F$.

In any of the turning angle ratio characteristic curves for the vehicle speeds V1 to V3, the rear wheel turning $\theta R$ increases in proportion to increase of the front wheel turning angle $\theta F$ until it reaches an upper limit $\theta R'$ corresponding to the value of $\theta R$ at the inflection point of the curve, and is kept at the upper limit $\theta R'$ even if the front wheel turning angle $\theta F$ is further increased. However, the inclination of the curve in the G region in which the value of $\theta R$ increases in proportion to increase of the value of $\theta F$ becomes larger as the vehicle speed increases, whereby the value of $\theta R$ reaches the upper limit $\theta R'$ at a smaller value of $\theta F$ as the vehicle speed increases. Therefore, the higher the vehicle speed is, the larger the turning angle ratio ($\theta R/\theta F$) is, and vice versa. Further, the higher the vehicle speed is, the narrower the G region is, and the lower the vehicle speed is, the wider the G region is (G3 > G2 > G1).

Figure 2:
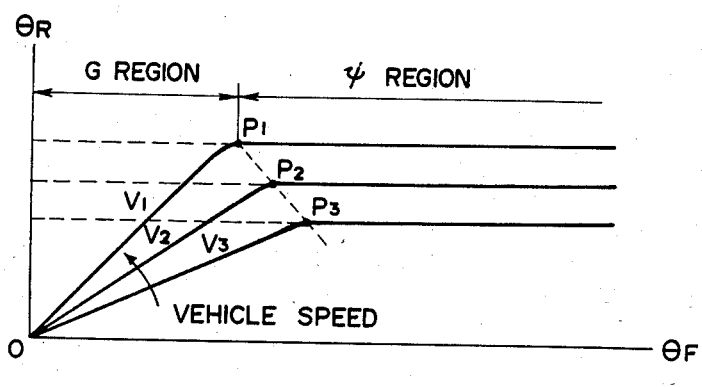

In the embodiment shown in FIG. 2, the upper limit $\theta R'$ of the rear wheel turning angle $\theta R$, i.e., the value of $\theta R$ at the inflection point, becomes larger as the vehicle speed increases in contrast with the embodiment of FIG. 1, though the inclination of the curve becomes larger as the vehicle speed increases as in the embodiment of FIG. 1. That is in this embodiment, the inflection point is shifted, as the vehicle speed increases, in the direction in which the value of $\theta F$ is reduced and the value of $\theta R$ is increased. In accordance with this embodiment, the difference between the front wheel turning angle $\theta F$ and the rear wheel turning angle $\theta R$ becomes larger as the vehicle speed is reduced since the upper limit $\theta R'$ of the rear wheel turning angle $\theta R$ becomes smaller as the vehicle speed is reduced. Accordingly, the lower the vehicle speed is, the larger the yaw rate is. This is advantageous in that in most cases where orientation of the vehicle is to be changed by a large amount, the vehicle speed is low.

Figure 3:
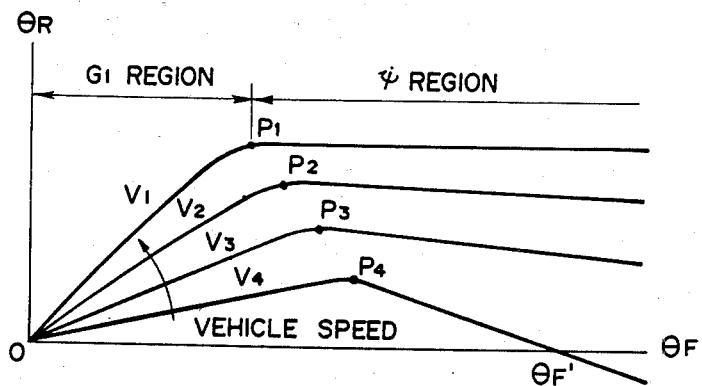

Also in the embodiment shown in FIG. 3, the inflection point is shifted, as the vehicle speed increases, in the direction in which the value of $\theta F$ is reduced and the value of $\theta R$ is increased. However, in the embodiment of FIG. 3, the inclination of each characteristic curve is negative after the inflection point is reached, i.e., in the $\psi$ region, except in the curve for the high speed V1. The absolute value of the inclination of the curve in the $\psi$ region is increased as the vehicle speed is reduced and in the case of the curve for the very low vehicle speed V4, the rear wheel turning angle $\theta R$ is reduced to below zero when the front wheel turning angle $\theta F$ exceeds a predetermined value $\theta F'$. A value of the rear wheel turning angle $\theta R$ less than zero means that the rear wheels are turned in opposite direction to the front wheels, i.e., in the reverse phase.

In the embodiments shown in FIGS. 1 to 3, since the inflection point P (P1, P2 ...) is shifted in the direction in which the value of the front wheel turning angle $\theta F$ is reduced with increase of the vehicle speed, the G region is narrowed and the rear wheel turning angle $\theta R$ reaches the upper limit at a smaller value of $\theta F$ as the vehicle speed increases, whereby the driving performance is improved, and at the same time the turning angle ratio ($\theta R/\theta F$) is increased as the vehicle speed increases, thereby improving response in changing lanes during intermediate to high speed operation of the vehicle.

Figure 4:
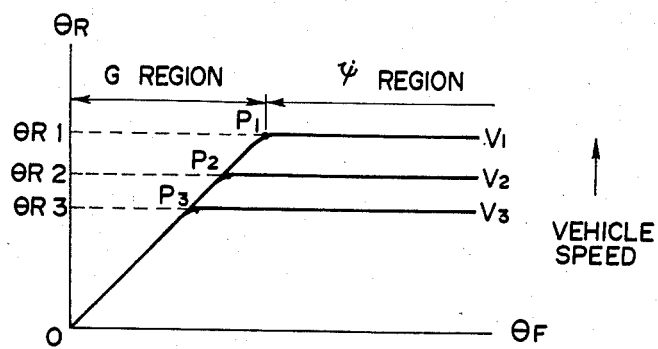
Figure 5:
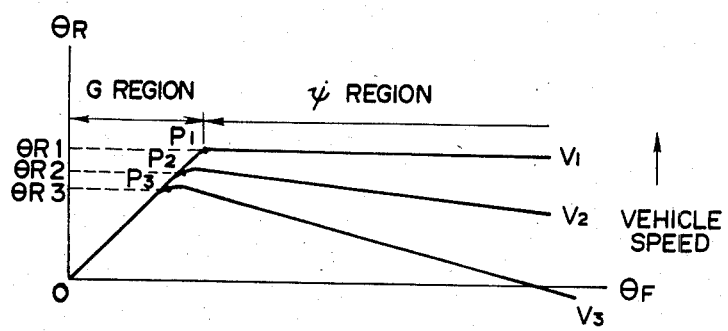
Figure 6:
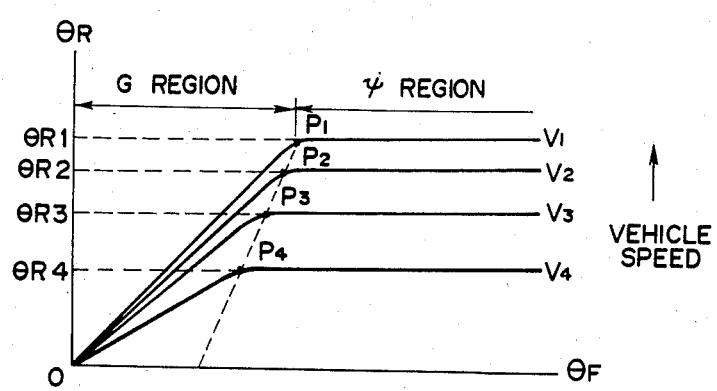

In the embodiments shown in FIGS. 4 to 6, the inflection point is shifted as the vehicle speed increases in the direction in which the value of $\theta R$ is increased. That is, the values $\theta R1$, $\theta R2$ and $\theta R3$ of $\theta R$ at the respective inflection points P1, P2 and P3 increase in this order. The value $\theta R4$ of $\theta R$ at the inflection point P4 in the embodiment of FIG. 6 is smaller than that at the inflection point P3.

In the embodiment of FIG. 4, the inclinations of the respective curves for the vehicle speeds V1 to V3 are equal to each other until the respective inflection points P1 to P3 are reached, i.e., in the G region, and are kept at zero after the respective inflection points P1 to P3 are reached, i.e., in the $\psi$ region. Accordingly the difference between the front wheel turning angle $\theta F$ and the rear wheel turning angle $\theta R$ is increased as the vehicle speed is reduced, whereby the cornering performance is improved.

The embodiment shown in FIG. 5 is similar to that shown in FIG. 4 except that the inclinations of the curves for the vehicle speeds V2 and V3 in the $\psi$ region are negative, the absolute value of the inclination of the latter curve being larger than that of the former curve. That is, the rear wheel turning angle $\theta R$ is kept at a constant value in the $\psi$ region irrespective of the front wheel turning angle $\theta F$ when the vehicle is running at the speed V1 while when the vehicle is running at a speed lower than the speed V1, the rear wheel turning angle $\theta R$ is reduced as the front wheel turning angle $\theta F$ increases in the $\psi$ region, the rate of reduction of the rear wheel turning angle being increased as the vehicle speed is reduced.

In the embodiment shown in FIG. 6, the rear wheel turning angle $\theta R$ is increased in proportion to increase of the front wheel turning angle $\theta F$ irrespective of the vehicle speed in the G region though the increasing rate of the rear wheel turning angle $\theta R$ varies with the vehicle speed, and is kept at a constant value irrespective of the front wheel turning angle $\theta F$ though the constant value varies with the vehicle speed. The increasing rate of the rear wheel turning angle in the G region when the vehicle speed is V1 is equal to that of the embodiment shown in FIG. 4. That is, the inclination of the curve for the vehicle speed V1 in the G region in the embodiment shown in FIG. 6 is equal to that in the embodiment shown in FIG. 4. However the inclination of the curve for the vehicle speed V2 in the G region is smaller than that for the vehicle speed V1, and the inclination of the curve for the vehicle speed V3 in the G region is smaller than that of the curve for the vehicle speed of V2, and the inclination of the curve for the very low speed V4 in the G region is still smaller. Thus in the embodiment shown in FIG. 6, the rear wheel turning angle $\theta R$ in the $\psi$ region is reduced with reduction of the vehicle speed by a larger reduction rate as compared with the embodiment shown in FIG. 4, whereby the cornering performance is further improved.

In the embodiments shown in FIGS. 4 to 6, large lateral acceleration is obtained when the steering wheel is turned during high speed operation while the lateral acceleration is limited as the vehicle speed is reduced, since the inflection point (P1, P2 ...) from which the turning angle ratio $\theta R/\theta F$ is reduced is shifted as the vehicle speed is reduced in the direction in which the value of $\theta R$ is reduced.

Figure 7:
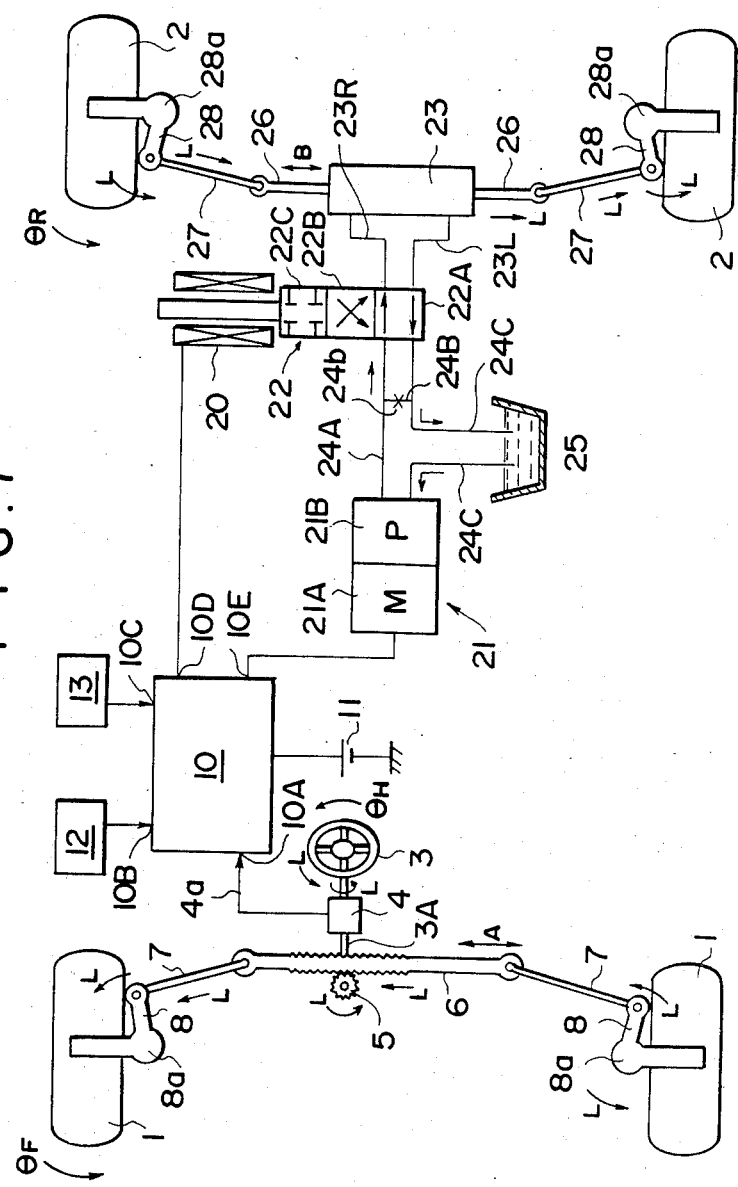
FIG. 7 is a schematic view illustrating a four-wheel steering device in accordance with an embodiment of the present invention.
Figure 8:
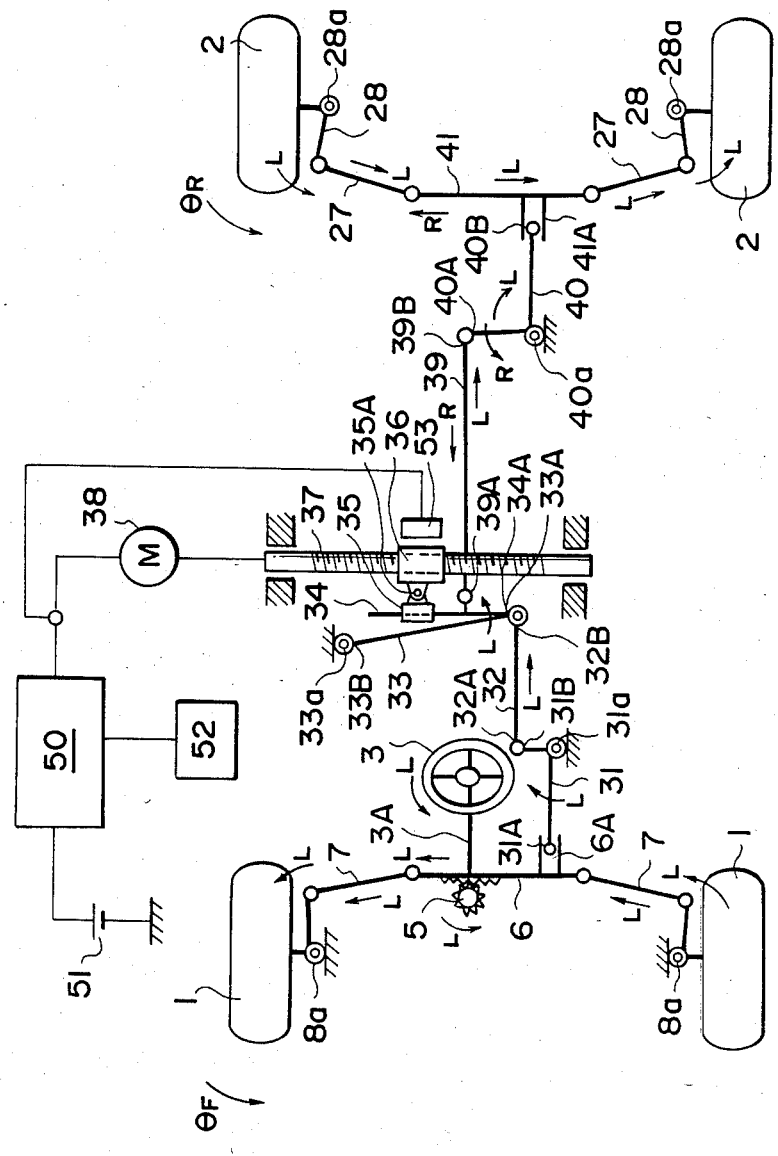
FIG. 8 is a schematic view illustrating a four-wheel steering device in accordance with another embodiment of the present invention.

FIG. 7 shows a four-wheel steering device in accOrdance with an embodiment of the present invention in which hydraulic pressure is utilized for controlling the rear wheels in accordance with the control characteristics of the present invention, while FIG. 8 shows another embodiment of the present invention in which a link mechanism is utilized for controlling the rear wheels.

In the embodiment shown in FIG. 7, front wheels 1 and rear wheels 2 are mechanically separated from each other, and the rear wheels 2 are turned under the control of a controller 10 into which is inputted the output of a front wheel turning angle sensor 4 for detecting the turning angle of the front wheels 1 by way of turning angle $\theta H$ of the steering wheel 3.

The front wheel steering mechanism comprises a steering shaft 3A to which the steering wheel 3 is fixed, a pinion 5, a rack 6, a pair of tie rods 7 connected on opposite ends of the rack 6, and a pair of knuckle arms 8 pivotable about pins 8a. The operation of this mechanism is well known. That is, when the steering wheel 3 is turned, the pinion 5 fixed to the lower end of the steering shaft 3A is rotated to move the rack 6 in the lateral direction of the vehicle body shown by the arrow A, whereby the front wheels 1 are turned by way of the tie rods 7 and the knuckle arms 8.

The operation of the steering device of this embodiment will be described taking the case where the steering wheel 3 is turned to the left.

When the steering wheel 3 is turned to the left as shown by the arrow L, the steering shaft 3A, the pinion 5, the rack 6, the tie rods 7 and the knuckle arms 8 are moved in the directions shown by the respective arrows L to turn the front wheels 1 leftward. The front wheel turning angle sensor 4 outputs a signal 4a representing that the steering wheel 3 is rotated by an angle $\theta H$ in the direction of the arrow L. The signal 4a is inputted into a front wheel turning angle input terminal 10A of the controller 10 for the rear wheel steering mechanism.

The controller 10 is connected to a power source 11 and has, in addition to the front wheel turning angle input terminal 10A, a vehicle speed input terminal 10B connected to a vehicle speed sensor 12, a feedback input terminal 10C connected to a rear wheel turning angle sensor 13, a turning direction output terminal 10D connected to a solenoid 20 for controlling the turning direction of the rear wheels 2, and a hydraulic pump control output terminal 10E connected to a driving motor 21A of a hydraulic pump device 21.

The hydraulic pump device 21 comprises the driving motor 21A and a hydraulic pump 21B for discharging hydraulic oil. The hydraulic pump 21B is connected to a hydraulic actuator 23 by way of a turning direction switching valve 22. An orifice passage 24B short-circuiting between an oil feed passage 24A and an oil return passage 24C is provided between the hydraulic pump 21B and the switching valve 22. The orifice passage 24B is provided with an orifice 24b at an intermediate portion thereof. The oil return passage 24C is provided with an oil reservoir 25 at an intermediate portion thereof.

The turning direction switching valve 22 has a normal valve part 22A, a reverse valve part 22B and a stop valve part 22C, each having a pair of inlets and a pair of outlets, each inlet being communicated with one outlet. The valve parts 22A to 22C are selectively connected with the oil feed passage 24A and the oil return passage 24C under the control of the solenoid 20. When each valve part is connected with the oil feed passage 24A and the oil return passage 24C, the pair of outlets of the valve part are respectively connected to right and left oil passages 23R and 23L of the hydraulic actuator 23 to selectively communicate the right and left oil passages 23R and 23L with the oil feed passage 24A and the oil return passage 24C. When the normal valve part 22A is positioned in the operative position, i.e., is connected with the oil feed passage 24A and the oil return passage 24C, the oil feed passage 24A is communicated with the right oil passage 23R of the hydraulic actuator 23 and the oil return passage 24C is communicated with the left oil passage 23L. When the reverse valve part 22B is positioned in the operative position, the oil feed passage 24A is communicated with the left oil passage 23L and the oil return passage 24C is communicated with the right oil passage 23R.

The hydraulic actuator 23 moves its output shaft 26 in the lateral direction of the vehicle body shown by the arrow B according to the difference between the pressure in the right oil passage 23R and the pressure in the left oil passage 23L. Each end of the output shaft 26 is connected to one of the rear wheels 2 by way of a tie rod 27 and a knuckle arm 28 pivotable about a pin 28a.

When the front wheels 1 are turned leftward in the direction of the arrow L and the rear wheels 2 are to be turned in the equal phase, i.e., in the same direction as the front wheels 1, the normal valve part 22A of the turning direction switching valve 22 is brought into the operative position and the hydraulic oil is fed into the oil feed passage 24A. The hydraulic oil flows into the oil return passage 24C passing through the orifice passage 24B, then returns to the hydraulic pump 21B via the reservoir 25. Thus the pressure becomes higher upstream of the orifice 24b than downstream of the same, and accordingly the pressure in the right oil passage 23R of the hydraulic actuator 23 connected to the oil feed passage 24A by way of the normal valve part 22A of the turning direction switching valve 22 becomes higher than the pressure in the left oil passage 23L connected to the return passage 24C. Thus the output shaft 26 of the actuator 23 is moved leftward to turn the rear wheels 2 leftward by way of the tie rods 27 and the knuckle arms 28. The amount of the movement of the output shaft 26 of the actuator 23 and accordingly the turning angle of the rear wheels 2 is determined according to the amount of electric current inputted into the driving motor 21A of the hydraulic pump device 21.

As can be easily understood from the description above, when the front wheels 1 are instead turned rightward and the rear wheels 2 are to be turned in the equal phase, the reverse valve part 22B of the turning direction switching valve 22 is brought into the operative position instead of the normal valve part 22A. Thus, the pressure in the left oil passage 23L of the hydraulic actuator 23 becomes higher than that in the right oil passage 23R, whereby the output shaft 26 is moved rightward to turn the rear wheels 2 rightwardly.

In case that the rear wheels 2 are to be turned in the reverse phase, i.e., to be turned in the direction opposite to the front wheels 1, the reverse valve part 22B is brought into the operative position when the front wheels 1 are turned leftward while the normal valve part 22A is brought into the operative position when the front wheels 1 are turned rightward.

When the rear wheel turning angle $\theta R$ is to be set at zero, the stop valve part 22C is brought into operative position to disconnect the hydraulic actuator 23 from the hydraulic pump 21B, thereby nullifying the difference in pressure between the right and left oil passages 23R and 23L of the actuator 23 to hold the output shaft 26 in the neutral position. It is preferred that the output shaft 26 of the actuator 23 be provided with a set load so that the output shaft 26 is positively positioned in the neutral position when the pressure difference is nullified.

The turning direction of the front wheels 1 is inputted into the controller 10 by way of the output signal 4a of the front wheel turning angle sensor 4, and the controller 10 determines in which direction the rear wheels 2 are to be turned, i.e., in the equal phase or in the reverse phase, according to the vehicle speed detected by the vehicle speed sensor 12.

The controller 10 receives the output signal 4a of the front wheel turning angle sensor 4 and the output of the vehicle speed sensor 12 and controls the rear wheels 2 by way of the solenoid 20 and the driving motor 21A in accordance with control characteristics such as those shown in FIGS. 1 to 7.

The embodiment shown in FIG. 7 in which the hydraulic actuator 23 is used for driving the rear wheels 2 is advantageous in that the rear wheels 2 can be smoothly turned and no additional load is placed on the steering system.

However, heavy and expensive parts such as an electric motor, a hydraulic pump, a hydraulic actuator and valves are required for the hydraulic devices, which adds to the manufacturing cost and weight of the vehicle. Therefore hydraulic devices are not suitable for compact size cars.

Now, another embodiment of the present invention which uses a link mechanism for controlling the rear wheels and which is free from the drawbacks inherent to the hydraulic devices and is suitable for compact size cars will be described referring to FIG. 8.

In FIG. 8, the parts analogous to the parts in FIG. 7 are given like numerals and such parts will not be described here.

In FIG. 8, the tie rods 27 for the right and left rear wheels 2 are connected by a steering rod 41 which is movable in the lateral direction of the vehicle body to turn the rear wheels 2 rightwardly and leftwardly by way of the tie rods 27 and the knuckle arms 28. The steering rod 41 is operatively connected with the rack 6 of the front wheel steering device by way of a link mechanism. The link mechanism comprises a first L-shaped lever 31 which is rotatably supported on a fixed shaft 31a and has its one end 31A slidably received in a slot 6A formed on the rack 6. A connecting lever 32 is pivotably connected to the other end 31B of the first L-shaped lever 31 at one end 32A thereof. A pivotable lever 33 is pivotably connected to the other end 32B of the connecting lever 32 at one end 33A thereof and is pivotably supported on a fixed shaft 33a at the other end 33B thereof. A control lever 34 is pivotably connected to the end 32B of the connecting lever 32 together with the end 33A of the pivotable lever 33 at one end 34A thereof. The free end portion of the control lever 34 is slidably received in a receiving sleeve 35 which is mounted on a feed sleeve 36 by way of a pivot 35A. The feed sleeve 36 is engaged with a screw rod 37 to be slid back and force in the lateral direction of the vehicle body when the screw rod 37 is rotated. The screw rod 37 is rotated by a driving motor 38. To an intermediate portion of the control lever 34 is connected one end 39A of a connecting lever 39. The other end 39B of the connecting lever 39 is pivotably connected to one end 40A of a second L-shaped lever 40 which is pivotably supported on a fixed shaft 40a. The other end 40B of the second L-shaped lever 40 is slidably received in a slot 41A formed on the steering rod 41.

The driving motor 38 is connected to a controller 50 and is driven by the output thereof. The controller 50 is connected to a power source 51 and receives the output of a vehicle speed sensor 52. A potentiometer 53 for feeding back the position of the feed sleeve 36 on the screw rod 37 to the input of the driving motor 38 is disposed near the screw rod 37.

When the steering wheel 3 is turned to the left as shown by the arrow L, the steering shaft 3A, the pinion 5, the rack 6, the tie rods 7 and the knuckle arms 8 are moved in the directions shown by the respective arrows L to turn the front wheels 1 leftward. When the rack 6 is moved in the direction of the arrow L, the first L-shaped lever 31 is rotated clockwisely (as seen in FIG. 8) by way of engagement between the end 31A thereof and the slot 6A. When rotated clockwisely, the first L-shaped lever 31 pushes rearwardly the connecting lever 32 to swing counterclockwisely the pivotable lever 33 about the fixed shaft 33a. On the other hand when the rack 6 is moved in the direction opposite to the arrow L, the first L-shaped lever 31 is rotated counterclockwisely and the pivotable lever 33 is swung clockwisely. When the pivotable lever 33 is swung, the control lever 34 is swung in the same direction about the pivot 35A, by way of which the receiving sleeve 35 is connected to the feed sleeve 36. As can be seen from FIG. 8, when the feed sleeve 36 is on the right side (upper side in FIG. 8) of the end 39A of the connecting lever 39 and accordingly the pivot 35A is on the right side of the end 39A, the connecting lever 39 is pushed rearwardly as shown by the arrow L in response to the counterclockwise movement of the control lever 34, while when the feed sleeve 36 and the pivot 35A are on the left side of the end 39A of the connecting lever 39, the connecting lever 39 is pulled forwardly in response to the counterclockwise movement of the control lever 34. On the other hand, when the control lever 34 is swung clockwisely with the pivot 35A on the right side of the end 39A, the connecting lever 39 is pulled forwardly, while when the control lever 34 is swung clockwisely with the pivot 35A on the left side of the same, the connecting lever 39 is pushed rearwardly. When the pivot 35A is aligned with the end 39A of the connecting lever 39, the connecting lever 39 is not moved upon movement of the control lever 34 in either direction.

When the connecting lever 39 is pushed rearwardly, the second L-shaped lever 40 is rotated clockwisely as shown by the arrow L and the steering rod 41 is moved in the direction of the arrow L by way of the engagement between the end 40B of the second L-shaped lever 40 and the slot 41A of the steering rod 41 to turn the rear wheels leftward. On the other hand when the connecting lever 39 is pulled forwardly, the second L-shaped lever 40 is rotated counterclockwisely as shown by the arrow R and the rear wheels 2 are turned rightward.

That is, when the front wheels 1 are turned leftward with the feed sleeve 36 and the pivot 35A on the right side of the end 39A of the connecting lever 39, the rear wheels 2 are also turned leftward, while when the front wheels 1 are turned rightward with the feed sleeve 36 on the right side of the same, the rear wheels 2 are also turned rightward. On the other hand, when the feed sleeve 36 is on the left side of the end 39A of the connecting lever 39, the rear wheels 2 are turned in the direction opposite to the front wheels 1. Thus, when the feed sleeve 36 is on the right side of the end 39A, the rear wheels 2 are turned in the equal phase while when the feed sleeve 36 is left side of the same, the rear wheels 2 are turned in the reverse phase. When the pivot 35A is aligned with the end 39A, the rear wheels 2 are not turned even when the front wheels 1 are turned.

The turning angle of the second L-shaped lever 40 relative to that of the first L-shaped lever 31 and accordingly the turning angle of the rear wheels 2 relative to the turning angle of the front wheels 1 can be controlled by controlling the distance between the end 39A of the connecting lever 39 and the pivot 35A.

The feed sleeve 36 (and consequently the pivot 35A) is moved by rotating the screw rod 37 by the driving motor 38 which is driven by the output of the controller 50. Thus the controller 50 controls the turning direction and the turning angle of the rear wheels 2.

We claim:

1. A four-wheel steering device for a vehicle comprising a front wheel steering mechanism for turning the front wheels, a rear wheel steering mechanism for turning the rear wheels, a vehicle speed sensor for detecting the vehicle speed and a controller for controlling the rear wheel steering mechanism characterized in that said controller controls the rear wheel steering mechanism so that the rear wheel turning angle is changed in accordance with a turning angle ratio characteristic curve defined on a $\theta F - \theta R$ plane wherein $\theta F$ and $\theta R$ respectively represent the front wheel turning angle and the rear wheel turning angle, said turning angle ratio characteristic curve being substantially a broken line having an inflection point at which the inclination thereof is changed, the turning angle ratio characteristic curve having a positive first inclination in the region where the value of $\theta F$ is smaller than the value of $\theta F$ at the inflection point and a second inclination smaller than the first inclination in the region where the value of $\theta F$ is not smaller than the value of $\theta F$ at the inflection point, and said turning angle ratio characteristic curve being changed according to the vehicle speed so that the turning angle ratio $\theta R/\theta F$ is increased as the vehicle speed increases.

2. A four-wheel steering device as defined in claim 1, in which said turning angle ratio characteristic curve is changed according to the vehicle speed so that the inflection point is shifted, as the vehicle speed increases, in the direction in which the value of $\theta F$ is reduced, thereby increasing the turning angle ratio $\theta R/\theta F$ as the vehicle speed increases.

3. A four-wheel steering device as defined in claim 2, in which the inclination of each turning angle ratio characteristic curve in the region where the value of $\theta F$ is not smaller than the value of $\theta F$ at the inflection point is zero.

4. A four-wheel steering device as defined in claim 2, in which the inclination of the turning angle ratio characteristic curve in the region where the value of $\theta F$ is smaller than the value of $\theta F$ at the inflection point is increased as the vehicle speed increases.

5. A four-wheel steering device as defined in claim 1, in which said turning angle ratio characteristic curve is changed so that the inflection point is shifted, as the vehicle speed increases, in the direction in which the value of $\theta R$ is increased, thereby increasing the turning angle ratio $\theta R/\theta F$ as the vehicle speed increases.

6. A four-wheel steering device as defined in claim 5, in which the inclination of each turning angle ratio characteristic curve in the region where the value of $\theta F$ is not smaller than the value of $\theta F$ at the inflection point is zero.

7. A four-wheel steering device as defined in claim 5, in which the inclination of the turning angle ratio characteristic curve in the region where the value of $\theta F$ is not smaller than the value of $\theta F$ at the inflection point is zero at most and is reduced as the vehicle speed is reduced.

8. A four-wheel steering device as defined in claim 5, in which said turning angle ratio characteristic curve is changed so that the inflection point is shifted, as the vehicle speed increases, in the direction in which the value of $\theta F$ is reduced and the value of $\theta R$ is increased.

9. A four-wheel steering device as defined in claim 8, in which the inclination of each turning angle ratio characteristic curve in the region where the value of $\theta F$ is not smaller than the value of $\theta F$ at the inflection point is zero.

10. A four-wheel steering device as defined in claim 8, in which the inclination of the turning angle ratio characteristic curve in the region where the value of $\theta F$ is not smaller than the value of $\theta F$ at the inflection point is zero at most and is reduced as the vehicle speed is reduced.

11. A four-wheel steering device as defined in claim 8, in which the inclination of the turning angle ratio characteristic curve in the region where the value of $\theta F$ is smaller than the value of $\theta F$ at the inflection point is increased as the vehicle speed increases.

12. A four-wheel steering device as defined in claim 1, in which said rear wheel steering mechanism comprises a hydraulic actuator operatively connected to the rear wheels to turn them, a hydraulic pressure source for delivering hydraulic pressure to the hydraulic actuator and a control valve operatively inserted between the hydraulic actuator and the hydraulic pressure source to control the direction of the pressure to be fed to the hydraulic actuator, thereby controlling the turning direction of the rear wheels, said controller controlling the hydraulic pressure source and the control valve to control the value and direction of the hydraulic pressure to be delivered to the hydraulic actuator according to said turning angle ratio characteristic curve.

13. A four-wheel steering device as defined in claim 1, in which said rear wheel steering mechanism comprises a control lever means which is operatively connected to the front wheel steering mechanism to be swung on a movable pivot in first and second directions according to the turning direction of the front wheels, a connecting lever means which is movable in first and second directions and is connected to the control lever means at a junction point at an intermediate portion of the control lever means so that when the movable pivot is on one side of the junction point, the swinging movements of the control lever means in the first and second directions respectively cause the movements of the connecting lever means in the first and second directions, while when the movable pivot is on the other side of the junction point, the swinging movements of the control lever means in the first and second directions respectively cause the movements of the connecting lever means in the second and first directions, the connecting lever means being operatively connected to the rear wheels to turn them in response to the movement thereof in the first or second direction, the amount of the movement of the connecting lever means relative to the amount of the movement of the control lever means being determined by the distance between the junction point and the movable pivot, and said controller controlling the position of the movable pivot to control the turning angle of the rear wheels according to said turning angle ratio characteristic curve.

* * * * *